United States Patent [19]

Fine

[11] Patent Number: 4,925,814
[45] Date of Patent: May 15, 1990

[54] ULTRAVIOLET TRANSMITTING GLASSES FOR EPROM WINDOWS

[75] Inventor: Gerald J. Fine, Corning, N.Y.

[73] Assignee: Corning Incorporated, Corning, N.Y.

[21] Appl. No.: 316,184

[22] Filed: Feb. 27, 1989

[51] Int. Cl.$^5$ .............................................. C03C 3/091
[52] U.S. Cl. ....................................... 501/66; 501/56; 501/905
[58] Field of Search ........................... 501/905, 56, 66

[56] References Cited

U.S. PATENT DOCUMENTS 4,792,535  12/1988  Fine ......................................... 501/56

Primary Examiner—Mark L. Bell
Assistant Examiner—Deborah Jones
Attorney, Agent, or Firm—Clinton S. Janes, Jr.

[57] ABSTRACT

Ultraviolet transmitting glasses exhibiting coefficients of thermal expansion between $46-52 \times 10^{-7}/°$ C. and transmittances at a thickness of 1 mm of at least 80% at a wavelength of 254 nm which are essentially free of fluoride and consist essentially, in mole percent, of 60–70% $SiO_2$, 16–20% $B_2O_3$, 1–8% $Al_2O_3$, 1–6% $Li_2O$, 2.5–5% $N_2O$, 0–3% $K_2O$, and 0–25% Cl, wherein the mole ratio $R_2O:R_2O_3$ is greater than 0.3, but less than 0.5.

3 Claims, No Drawings

ULTRAVIOLET TRANSMITTING GLASSES FOR EPROM WINDOWS

BACKGROUND OF THE INVENTION

In general terms, an Erasable, Programmable, Read-Only, Memory (EPROM) package comprises:
(a) an insulating board having a chip mounting portion and having conductive interconnecting patterns thereon; one end of each of those patterns being adjacent to the chip mounting portion;
(b) an EPROM chip mounted on the chip mounting portion; the chip having a plurality of electrodes on a surface thereof;
(c) means for connecting said electrodes to the one end of each of the patterns; and
(d) a covering insulating board containing a window composed of an ultraviolet transmitting glass.

This invention is directed to the production of a family of ultraviolet transmitting glass compositions expressly designed for use as windows in EPROM chips. The following four criteria have been determined to be quite desirable in glasses designed for that application:

First, the glasses must manifest coefficients of thermal expansion (0°-300° C.) between $46-52 \times 10^{-7}/°C.$ to insure sound sealing with $Al_2O_3$ which is commonly used as the insulating material in EPROM packages;

Second, the glasses must demonstrate transmittances of at least 80% in thicknesses of 1 mm at a wavelength of 254 nm;

Third, the glasses must possess softening points below 700° C. to permit rapid sealing to $Al_2O_3$;

Fourth, the glass compositions must be free of fluoride inasmuch as volatilization of fluorine during melting leads to difficulties in glass forming and is an environmental hazard.

The types of aluminas used by EPROM fabricators vary widely. Hence, the various aluminas have different microstructures and, as a result, different intrinsic strengths and thermal expansions. As an illustration, the coefficient of thermal expansion of commercially-marketed aluminas (0°-300° C.) can vary over the range of about $65-80 \times 10^{-7}/°C.$ Such substantial variation quite obviously affects both the integrity of a glass-alumina seal and the amount of stress generated in the alumina during cooling of the seal, given any single glass composition window.

In common sealing practice, an expansion mismatch between the components being sealed together of less than 500 parts per million (ppm) is generally interpreted as a good seal, while differentials of less than 1000 ppm can be resolved into sound seals in more extraordinary circumstances. In the fabrication of EPROM packages, experience repeatedly demonstrated that expansion differentials between the glass and alumina greater than about 500 ppm create excessive stresses on both components of a seal. In such seals the excessive stress developed in the alumina has been deemed to cause the alumina components of the EPROM package to fracture.

Another extremely significant circumstance which must be considered in designing materials for EPROM packages is the fact that such packages must survive very demanding thermal shock requirements. Hence, the higher thermal conductivity of alumina during heating, when compared to conventional glasses, causes it to expand at a more rapid rate than the glass, thereby hazarding a loss of hermeticity in a seal with glass. Accordingly, a thermal expansion differential between the glass and alumina no less than about 200 ppm has been considered essential.

Therefore, the primary objective of the present invention was to develop glasses suitable for fabrication as windows for EPROM chips which satisfy the four above-mentioned criteria and, in addition, exhibit a thermal expansion differential between about 200-500 ppm when sealed in alumina.

SUMMARY OF THE INVENTION

I have found that objective can be achieved in glass compositions essentially free of fluoride and consisting essentially, expressed in terms of mole percent on the oxide basis, of

| $SiO_2$ | 60-70 | $Na_2O$ | 2.5-5 |
|---|---|---|---|
| $B_2O_3$ | 16-20 | $K_2O$ | 0-3 |
| $Al_2O_3$ | 1-8 | $Li_2O$ | 1-6 | but wherein the mole ratio $R_2O$ ($Li_2O + Na_2O + K_2O$):$R_2O_3$ ($B_2O_3 + Al_2O_3$) is greater than 0.3, but less than 0.5. Observance of this ratio is critical in securing glasses exhibiting the demanded ultraviolet transmittance, while maintaining the desired low softening point and coefficient of thermal expansion. Hence, where the level of alkali metal oxide is too low, the glass becomes hard; at too high levels of alkali metal oxides, the ultraviolet transmission is adversely affected. Whereas exact conversion of mole percent to weight percent is not mathematically possible, the above ranges in mole percent closely approximate the following composition intervals expressed in terms of weight percent:

| $SiO_2$ | 61-69 | $Li_2O$ | 0.5-3 |
|---|---|---|---|
| $B_2O_3$ | 18-22 | $Na_2O$ | 3-5.25 |
| $Al_2O_3$ | 1.5-12 | $K_2O$ | 0-3 |

Up to about 1.25 mole percent ($\approx 1$ weight percent) chloride may be included in its customary role as a fining agent for borosilicate glasses. Also, minor amounts (most preferably totalling less than 3 mole percent) of compatible metal oxides may be included to modify the melting and/or forming character of the glasses, or to impart some desired physical property thereto. Nevertheless, such additions must not cause a significant adverse impact upon the four above-described criteria. For example, CaO in an amount of about 0.3 weight percent appears to improve the melting character of the glasses.

PRIOR ART

My U.S. Pat. No. 4,792,535 was also directed to the production of alkali metal boroaluminosilicate glasses exhibiting in 1 mm thickness a transmittance of ultraviolet radiation at a wavelength of 254 nm of at least 80%. The glasses demonstrated coefficients of thermal expansion (0°-300° C.) between $56-62 \times 10^{-7}/°C.$, i.e., higher than those of the present inventive glasses, and consisted essentially, in weight percent, of

| $SiO_2$ | 58-62 | $Li_2O$ | 1-2.5 |
|---|---|---|---|
| $B_2O_3$ | 15-18 | $Na_2O$ | 5.5-6.5 |
| $Al_2O_3$ | 11.5-14.5 | $K_2O$ | 0-2 |

Those compositions are not only outside the range of Na$_2$O demanded in the glasses of the present invention and the ranges of SiO$_2$ and B$_2$O$_3$ generally lower and that of Al$_2$O$_3$ generally higher, but also, and most vitally, there is not even an allusion to the need for maintaining the R$_2$O and R$_2$O$_3$ contents within the critical ratio 0.3<R$_2$O:R$_2$O$_3$<0.5.

U.S. Pat. No. 4,792,535 refers to a number of prior art references and other patents were cited during the prosecution of the patent application. I believe, however, that the patent constitutes the most pertinent disclosure to the present invention.

DESCRIPTION OF PREFERRED EMBODIMENTS

Table I records a group of glass compositions, expressed in terms of mole percent on the oxide basis as calculated from the batch, illustrating the parameters of the instant invention. Table IA reports the same group of glasses, but expressed in terms of parts by weight on the oxide basis. Because the sum of the individual ingredients totals or closely approximates 100, for all practical purposes the values listed in Table IA for the several components can be considered to represent weight percent. Inasmuch as it is not known with which cation(s) the remainder of the chloride fining agent is combined, it is simply tabulated as chloride in accordance with conventional glass analysis practice. The actual batch ingredients can comprise any materials, either oxides or other compounds, which, when melted together, will be converted into the desired oxide in the proper proportions. For example, Li$_2$CO$_3$ and Na$_2$CO$_3$ may be used as sources for Li$_2$O and Na$_2$O, respectively. Nevertheless, because the presence of such impurities as iron oxide and titania deleteriously affects the ultraviolet transmission of the glass, batch materials of high purity are greatly preferred.

The presence of iron in the ferric state (Fe$^{+3}$) exerts an extremely deleterious effect upon ultraviolet transmission. Consequently, even though highly pure batch ingredients were employed, between about 0.3-2% by weight cornstarch was included in each glass batch to assure complete reduction of ferric iron to the ferrous state (FE$^{+2}$). The batches for the several glasses were compounded, the ingredients carefully mixed together to aid in securing a homogeneous melt, and then charged into silica crucibles. The crucibles were introduced into a furnace operating at about 1550° C. and the batches were melted for 4-6 hours with a flow of nitrogen gas being passed over the crucibles to retain a reducing environment therein. Thereafter, the crucibles were poured into steel molds to produce glass slabs having dimensions of about 5"×5"×0.5" and those slabs were immediately transferred to an annealer operating at about 500° C. Samples were cut from the annealed slabs and tested for ultraviolet transmittance and general physical properties.

It will be appreciated that, whereas the above-described procedure reflects laboratory melting and forming only, the glasses of the present invention can be melted in conventional glass melting facilities, including large continuously-melting tanks, and can be formed into desired configurations utilizing techniques conventional in the glassmaking art.

Table I recites the mole ratio R$_2$O:R$_2$O$_3$, the softening point, annealing point, and strain point in °C., the coefficient of thermal expansion (Coef. Exp.) over the range 0°–300° C. in terms of ×10$^{-7}$/°C., the liquidus (°C.), and the % transmittance at 254 nm in a ground and polished thickness of 1 mm.

TABLE I

| (Mole %) | | | | | | | |
|---|---|---|---|---|---|---|---|
| | 1 | 2 | 3 | 4 | 5 | 6 | 7 |
| SiO$_2$ | 68.1 | 71.0 | 66.1 | 65.0 | 65.1 | 69.0 | 64.2 |
| B$_2$O$_3$ | 18.9 | 18.9 | 18.9 | 17.0 | 18.9 | 18.9 | 19.1 |
| Al$_2$O$_3$ | 4.3 | 1.3 | 4.2 | 7.2 | 7.3 | 4.3 | 4.3 |
| Li$_2$O | 1.3 | 1.5 | 3.4 | 5.5 | 1.3 | 1.5 | 5.4 |
| Na$_2$O | 4.8 | 4.8 | 4.8 | 3.8 | 4.8 | 4.8 | 4.8 |
| K$_2$O | 1.5 | 1.5 | 1.5 | 0.5 | 1.5 | 0.5 | 1.5 |
| Cl | 1.1 | 1.1 | 1.1 | 1.1 | 1.1 | 1.1 | 0.6 |
| R$_2$O:R$_2$O$_3$ | 0.329 | 0.377 | 0.415 | 0.367 | 0.293 | 0.286 | 0.5 |
| Soft. | 692 | 699 | 674 | 683 | 751 | 706 | 653 |
| Ann. | 501 | 533 | 503 | 494 | 504 | 501 | 500 |
| Strain. | 463 | 496 | 470 | 459 | 458 | 462 | 471 |
| Coef. Exp. | 49 | 47 | 51 | 52 | 53 | 47 | 57.3 |
| Liquidus | 791 | — | — | 784 | 1033 | 792 | 842 |
| Trans. | 87 | 85 | 85 | 83 | 87 | 85 | 78 |

| | 8 | 9 | 10 | 11 | 12 | 13 |
|---|---|---|---|---|---|---|
| SiO$_2$ | 64.1 | 66.1 | 65.0 | 66.2 | 62.2 | 67.8 |
| B$_2$O$_3$ | 19.0 | 15.7 | 18.9 | 19.1 | 19.1 | 19.4 |
| Al$_2$O$_3$ | 4.3 | 7.3 | 7.3 | 4.3 | 10.3 | 4.1 |
| Li$_2$O | 1.3 | 4.5 | 1.3 | 1.4 | 1.4 | — |
| Na$_2$O | 4.8 | 5.2 | 5.7 | 4.8 | 4.8 | 6.5 |
| K$_2$O | 5.5 | — | 0.6 | 3.5 | 1.5 | 1.2 |
| Cl | 1.1 | 1.1 | 1.1 | 0.6 | 0.6 | 1.1 |
| Soft. | 690 | 708 | 751 | 695 | 784 | 712 |
| Ann. | 518 | 508 | 499 | 509 | — | 509 |
| Strain. | 482 | 469 | 454 | 473 | — | 469 |
| Coef. Exp. | 62 | 52 | 53 | 55.6 | 52.6 | 52.5 |
| Liquidus | — | 924 | — | — | — | — |
| Trans. | 82 | 75 | 77 | 83 | — | 84 |

TABLE IA

| (Parts By Weight) | | | | | | | |
|---|---|---|---|---|---|---|---|
| | 1 | 2 | 3 | 4 | 5 | 6 | 7 |
| SiO$_2$ | 64.2 | 68.4 | 62.9 | 61.8 | 60.2 | 65.5 | 61.6 |
| B$_2$O$_3$ | 20.8 | 21.2 | 21.0 | 18.8 | 20.4 | 20.9 | 21.2 |
| Al$_2$O$_3$ | 6.9 | 2.1 | 6.9 | 11.7 | 11.4 | 6.9 | 7.0 |
| Li$_2$O | 0.6 | 0.7 | 1.6 | 2.6 | 0.6 | 0.7 | 2.6 |
| Na$_2$O | 4.7 | 4.8 | 4.7 | 3.7 | 4.6 | 4.7 | 4.8 |
| K$_2$O | 2.2 | 2.3 | 2.2 | 0.7 | 2.2 | 0.7 | 2.3 |
| Cl | 0.6 | 0.6 | 0.6 | 0.6 | 0.6 | 0.6 | 0.6 |

| | 8 | 9 | 10 | 11 | 12 | 13 |
|---|---|---|---|---|---|---|
| SiO$_2$ | 59.1 | 62.7 | 60.4 | 61.6 | 56.3 | 63.4 |
| B$_2$O$_3$ | 20.4 | 17.4 | 20.5 | 20.6 | 20.0 | 21.0 |
| Al$_2$O$_3$ | 6.7 | 12.0 | 11.5 | 6.9 | 15.8 | 6.5 |
| Li$_2$O | 0.6 | 2.1 | 0.6 | 0.6 | 0.6 | — |
| Na$_2$O | 4.6 | 5.1 | 5.5 | 4.6 | 4.5 | 6.3 |
| K$_2$O | 7.9 | — | 0.9 | 5.1 | 2.1 | 1.8 |
| Cl | 0.6 | 0.6 | 0.6 | 0.6 | 0.6 | 1.1 |

An examination of Table I points out the extreme criticality of composition control needed in order to produce glasses exhibiting the demanded optical and physical properties. Hence, only Examples 1–4 demonstrate the required matrix of properties. Examples 5–7 illustrate the need for maintaining the mole ratio R$_2$O:R$_2$O$_3$ greater than 0.3, but less than 0.5. Thus, the individual components of those Examples fall within the defined ranges of those components, but the R$_2$O:R$_2$O$_3$ ratio is either too high or two low. Examples 8–13 are glasses having compositions close to the ranges required in the present invention, but one or more of the individual constituents is outside.

Example 1 is deemed to be the most preferred composition.

I claim:

1. An ultraviolet transmitting glass exhibiting a coefficient of thermal expansion between 46–52×10$^{-7}$/°C., a softening point below 700° C., and a transmittance at a thickness of 1 mm of at least 80% at a wavelength of 254 nm which is essentially free of fluoride and consists essentially, expressed in terms of mole percent on the oxide basis, of

| | | | |
|---|---|---|---|
| $SiO_2$ | 60–70 | $Na_2O$ | 2.5–5 |
| $B_2O_3$ | 16–20 | $K_2O$ | 0–3 |
| $Al_2O_3$ | 1–8 | $Li_2O$ | 1–6 | wherein the mole ratio $R_2O:R_2O_3$ is greater than 0.3, but less than 0.5.

2. An ultraviolet transmitting glass according to claim 1 wherein the batch therefor also contains up to 1.1% Cl.

3. An ultraviolet transmitting glass according to claim 2 having the approximate composition

| | | | |
|---|---|---|---|
| $SiO_2$ | 68.1 | $Na_2O$ | 4.8 |
| $B_2O_3$ | 18.9 | $K_2O$ | 1.5 |
| $Al_2O_3$ | 4.3 | Cl | 1.1 |
| $Li_2O$ | 1.3 | | |

* * * * *